(12) United States Patent
Lee

(10) Patent No.: US 8,511,915 B2
(45) Date of Patent: Aug. 20, 2013

(54) HOUSING ASSEMBLY AND SURVEILLANCE CAMERA APPARATUS INCLUDING THE SAME

(75) Inventor: Woon-ho Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 66 days.

(21) Appl. No.: 13/209,911

(22) Filed: Aug. 15, 2011

(65) Prior Publication Data

US 2012/0177357 A1 Jul. 12, 2012

(30) Foreign Application Priority Data

Jan. 12, 2011 (KR) ........................ 10-2011-0003158

(51) Int. Cl.
*H04N 5/225* (2006.01)
*G03B 17/56* (2006.01)

(52) U.S. Cl.
USPC .......................................... 396/427; 348/143

(58) Field of Classification Search
USPC ....................................................... 396/427
See application file for complete search history.

(56) References Cited

U.S. PATENT DOCUMENTS

| 5,394,184 | A  | * | 2/1995  | Anderson et al. | 348/151 |
|-----------|----|---|---------|-----------------|---------|
| 6,061,087 | A  | * | 5/2000  | Schieltz et al. | 348/151 |
| 6,877,551 | B2 | * | 4/2005  | Stoller         | 165/47  |
| 7,699,691 | B1 | * | 4/2010  | Voigt et al.    | 454/184 |
| 2005/0094994 | A1 | * | 5/2005 | Paolantonio et al. | 396/427 |
| 2005/0276599 | A1 | * | 12/2005 | Kajino et al.  | 396/419 |
| 2007/0126872 | A1 | * | 6/2007  | Bolotine et al. | 348/151 |

FOREIGN PATENT DOCUMENTS

| JP | 08205007 A | * | 8/1996 |
| JP | 09149301 A | * | 6/1997 |
| JP | 09-329678 A |  | 12/1997 |
| JP | 2002040554 A | * | 2/2002 |
| JP | 2009-135723 A |  | 6/2009 |
| KR | 1020090084383 A |  | 8/2009 |

* cited by examiner

*Primary Examiner* — Clayton E LaBalle
*Assistant Examiner* — Leon W Rhodes, Jr.
(74) *Attorney, Agent, or Firm* — Sughrue Mion, PLLC

(57) ABSTRACT

A housing assembly and a surveillance camera apparatus including the housing assembly are provided. The housing assembly includes a dome cover which receives a photographing component therein; an air blower which provides air to the dome cover; and a duct through which the air provided from the air blower is discharged to the dome cover.

19 Claims, 11 Drawing Sheets

HOUSING ASSEMBLY AND SURVEILLANCE CAMERA APPARATUS INCLUDING THE SAME

CROSS-REFERENCE TO RELATED PATENT APPLICATION

This application claims priority from Korean Patent Application No. 10-2011-0003158, filed on Jan. 12, 2011, in the Korean Intellectual Property Office, the disclosure of which is incorporated herein in its entirety by reference.

BACKGROUND

1. Field

Apparatuses consistent with exemplary embodiments relate to a housing assembly, and more particularly, to a surveillance camera apparatus including the housing assembly.

2. Description of the Related Art

In general, surveillance camera apparatuses are installed indoors, such as in banks and public office buildings, which need security, as well as in offices, houses and hospitals, and are widely used to control entry or to prevent crimes. Recently, surveillance camera apparatuses have been installed outdoors, such as in basement parking areas, residential areas and streets, due to increase of crimes.

When surveillance camera apparatuses are exposed to very low temperatures, for example, in winter or in freezing storages, condensations are accumulated on a dome cover due to a difference between temperatures inside and outside the surveillance camera apparatuses. The condensations make normal operations of the surveillance camera apparatuses impossible, and thus, the surveillance camera apparatuses may not operate well.

SUMMARY

One or more exemplary embodiments provide a housing assembly capable of preventing condensations, frost or moisture from accumulating on a dome cover that protects a photographing component, and a surveillance camera apparatus including the housing assembly.

One or more exemplary embodiments also provide a housing assembly capable of operating circuits normally by maintaining a temperature in the housing assembly at a predetermined level or higher, and a surveillance camera apparatus including the housing assembly.

According to an aspect of an exemplary embodiment, there is provided a housing assembly including: a cover which receives a photographing component therein; an air blower which provides air to the cover; and a duct through which the air provided from the air blower is discharged to the cover. The air blower may draw in the air from one direction and discharges the air in another direction. The duct may have a width that is gradually increased from an end to another end, and include an exhaust hole, through which the air is discharged to the cover, at around the other end and adjacent to the cover. The cover may be a dome cover.

The housing assembly may further include a heater which heats the air provided from the air blower.

The housing assembly may further include a heater that is adjacent to the air blower, wherein the air blower may draw in the air heated by the heater and provide the heated air to the duct.

The heater may operate at a reference temperature or less.

The exhaust hole may be curved along a circumference of the dome cover.

An arc length of the exhaust hole may be equivalent to or larger than 0.25 times the circumference of the dome cover.

The dome cover may be a hemisphere and the exhaust hole is formed as an arc curved along a circumference of the dome cover, and an arc length of the exhaust hole may be 0.25 times to 0.5 times the circumference of the dome cover.

The exhaust hole may be formed toward the dome cover so that the heated air discharged from the exhaust hole may flow along an inner surface of the dome cover disposed on a lower portion of the housing assembly.

According to another aspect of the present invention, there is provided a surveillance camera apparatus including: the housing assembly as described above and the photographing component.

According to an aspect of another exemplary embodiment, there is provided a housing assembly including: an air blower which generates and provides a flow of air to a dome cover which is configured to receive a photographing component therein; a heater heating the air provided from the air blower; and a duct comprising an exhaust hole through which the air flow provided from the air blower is discharged to the dome cover, wherein the exhaust hole of the duct is disposed adjacent to the dome cover. The duct may have a width that is gradually increased from an end portion to another portion, wherein the exhaust hole is disposed at the other portion.

The heater is received in the duct.

The duct may include a metal.

The exhaust hole may be curved along a circumference of the dome cover.

The dome cover may be hemispherical and the exhaust hole may be formed as an arc curved along the circumference of the dome cover, and an arc length of the exhaust hole may be equivalent to or larger than 0.25 times the circumference of the dome cover.

The dome cover is hemispherical and the exhaust hole is formed as an arc curved along the circumference of the dome cover, and an arc length of the exhaust hole is 0.25 times to 0.5 times the circumference of the dome cover.

The housing assembly may further include an inner case for guiding the heated air discharged through the exhaust hole to flow along the inner surface of the dome cover disposed under the housing assembly, and having an outer diameter that is less than an inner diameter of the dome cover.

An end portion of the inner case extends past the duct toward the cover.

The end portion faces an part of the dome cover.

The housing assembly includes only a single duct.

According to another aspect of the present invention, there is provided a surveillance camera apparatus including: the housing assembly as described above and the photographing component.

The exhaust hole may be formed as an arc curved along the circumference of the dome cover, and an arc length of the exhaust hole may be equivalent to or larger than 0.25 times the circumference of the dome cover.

The duct may include: a first duct portion having a width that is gradually increased from an end portion to another portion; and a second duct portion having a width that is gradually increased from an end portion to another portion, and coupled to the first duct portion so as to form the exhaust hole at the other portion.

The dome cover may be disposed at a side of the surveillance camera apparatus, the first and second duct portions may be coupled to each other such that the exhaust hole is formed toward the dome cover, and an end portion of the second duct portion may extend past the first duct portion toward the dome cover.

The surveillance camera apparatus may further include an inner case for guiding the heated air discharged through the exhaust hole to flow toward the dome cover and having an outer diameter that is less than an inner diameter of the dome cover, wherein the dome cover may be disposed at a side of the surveillance camera apparatus, and the first and second duct portions may be coupled to each other such that the exhaust hole is not formed toward the dome cover.

BRIEF DESCRIPTION OF THE DRAWINGS

The above and other aspects will become more apparent by describing in detail exemplary embodiments thereof with reference to the attached drawings, in which.

DETAILED DESCRIPTION OF EXEMPLARY EMBODIMENTS

The inventive concept now will be described more fully hereinafter with reference to the accompanying drawings, in which exemplary embodiments are shown. This inventive concept may, however, be embodied in many different forms and should not be construed as limited to the exemplary embodiments set forth herein; rather, these exemplary embodiments are provided so that this disclosure will be thorough and complete, and will fully convey the scope of the inventive concept to those skilled in the art. Like numbers refer to like elements throughout. The terminology used herein is for the purpose of describing particular exemplary embodiments only and is not intended to be limiting of the inventive concept. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section.

Figure 1:
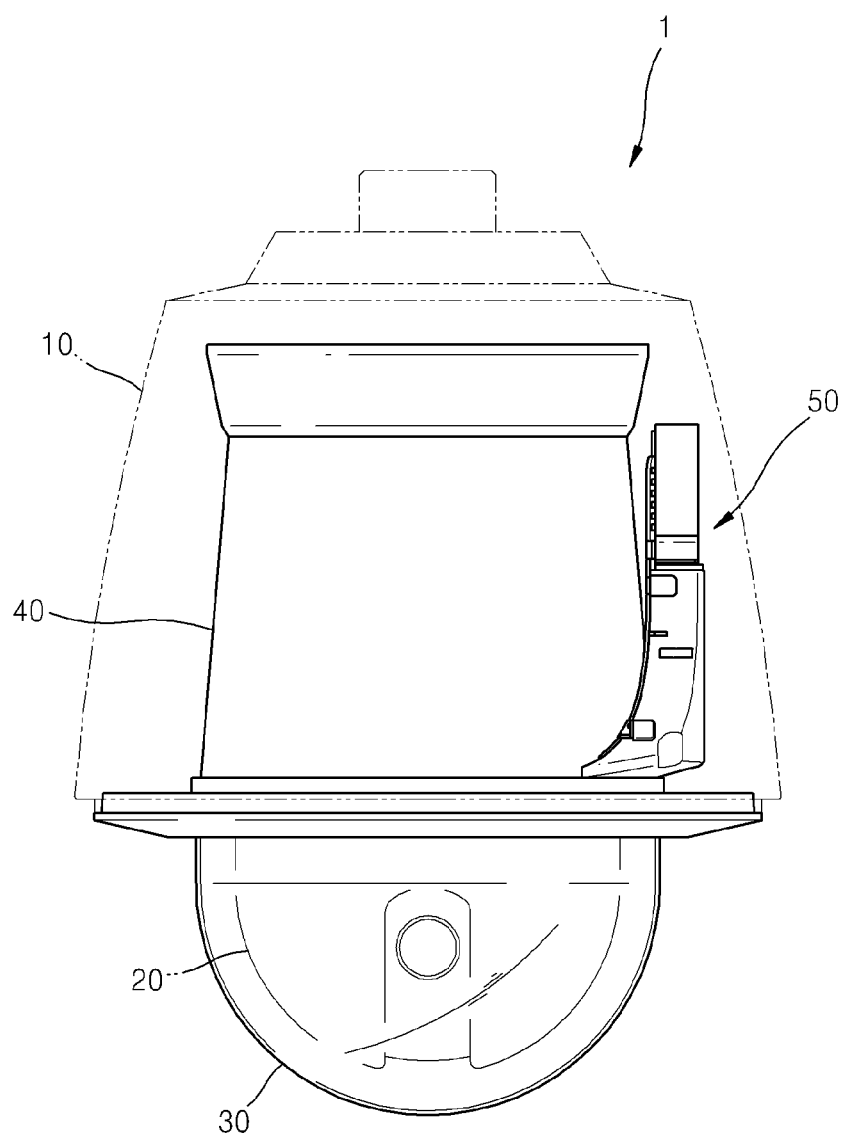
FIG. 1 is a schematic perspective view of a surveillance camera apparatus according to an exemplary embodiment.
Figure 2:
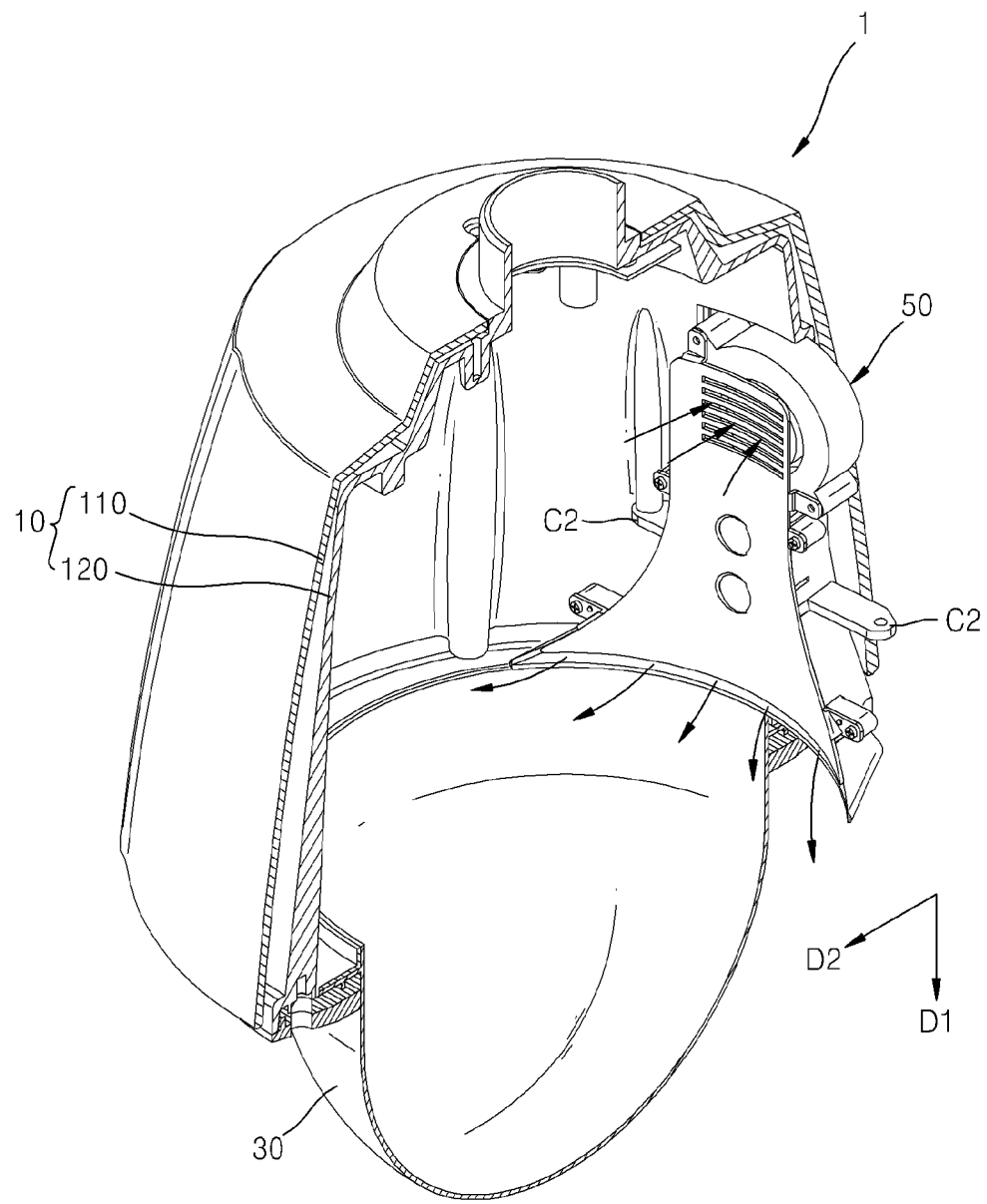
FIG. 2 is a perspective view of an inside of the surveillance camera apparatus, except for an inner case, components included in the inner case, and a photographing component, according to an exemplary embodiment.

FIG. 1 is a schematic perspective view of a surveillance camera apparatus 1 according to an exemplary embodiment, and FIG. 2 is a schematic perspective view of an inner portion of the surveillance camera apparatus 1 of FIG. 1, according to an exemplary embodiment. FIG. 2 shows the inner portion of the surveillance camera apparatus 1 except for an inner case 40, components included in the inner case 40, and a photographing portion 20 for convenience of explanation.

Referring to FIGS. 1 and 2, the surveillance camera apparatus 1 includes a housing 10, the photographing portion 20, a dome cover 30 for protecting the photographing portion 20 against external elements, and a condensation preventing unit 50 for preventing condensations or frost from accumulating on the dome cover 30. The dome cover 30, however, may be a different type other than the dome type.

The housing 10 is coupled to the dome cover 30 to protect the photographing portion 20, a motor (not shown) for driving the photographing portion 20, and a circuit module (not shown) that is electrically connected to the photographing portion 20. The housing 10 may be formed as a single-shell or a multiple-shell structure. If the housing 10 is formed as a dual-shell structure, an inner shell 120 may be coupled to the dome cover 30, and an outer shell 110 may surround the inner shell 120.

The photographing portion 20 photographs a subject that is a monitoring target, and may include one or more lenses. The photographing portion 20 may perform zoom-in/zoom-out functions. The photographing portion 20 may photograph the subject from various positions through a tilting operation and a panning operation.

The dome cover 30 receives the photographing portion 20 to protect the photographing portion 20 against external elements. The dome cover 30 may be coupled to the inner shell 120 of the housing 10 via connectors such as screws. The dome cover 30 may be formed of a transparent material in order not to interfere with a photographing operation of the photographing portion 20. The dome cover 30 may take a rounded shape.

The inner case 40 is included in the housing 10 to receive components such as the motor (not shown) for driving the photographing portion 20, and the circuit module (not shown) electrically connected to the photographing portion 20. In addition, the inner case 40 may change a proceeding direction of air that is discharged from the condensation preventing unit 50 such that the air may proceed along an inner circumferential surface of the inner case 40.

The condensation preventing unit 50 may discharge air in order to prevent condensations or frost from accumulating on the dome cover 30. The air may be heated air. The condensation preventing unit 50 may be disposed between the inner case 40 and the housing 10 along a circumference of the dome cover 30 which is connected to the inner shell 120 of the housing 10. A bottom portion of the condensation preventing unit 50 may be curved along the circumference of the dome cover 30. For example, if the dome cover 30 is a hemisphere, the bottom portion of the condensation preventing unit 50 may be formed as an arc that is curved along the circumference of the dome cover 30.

The condensation preventing unit 50 draws in air from one side and discharges the air out of another side. Here, the discharged air may be heated. Referring to FIG. 2, the condensation preventing unit 50 draws in the air in a direction opposite to a D2 direction, and discharges the air in the D2 direction. The air discharged in the D2 direction flows along the inner surface of the dome cover 30 due to the inner case 40, and, if the air is heated air, the air may heat all portions of the dome cover 30. A configuration that heats the dome cover 30 by using the heated air discharged from the condensation preventing unit 50 will be described later with reference to FIGS. 5 and 6. Hereinafter, a detailed structure of the condensation preventing unit 50 will be described as follows.

Figure 3:
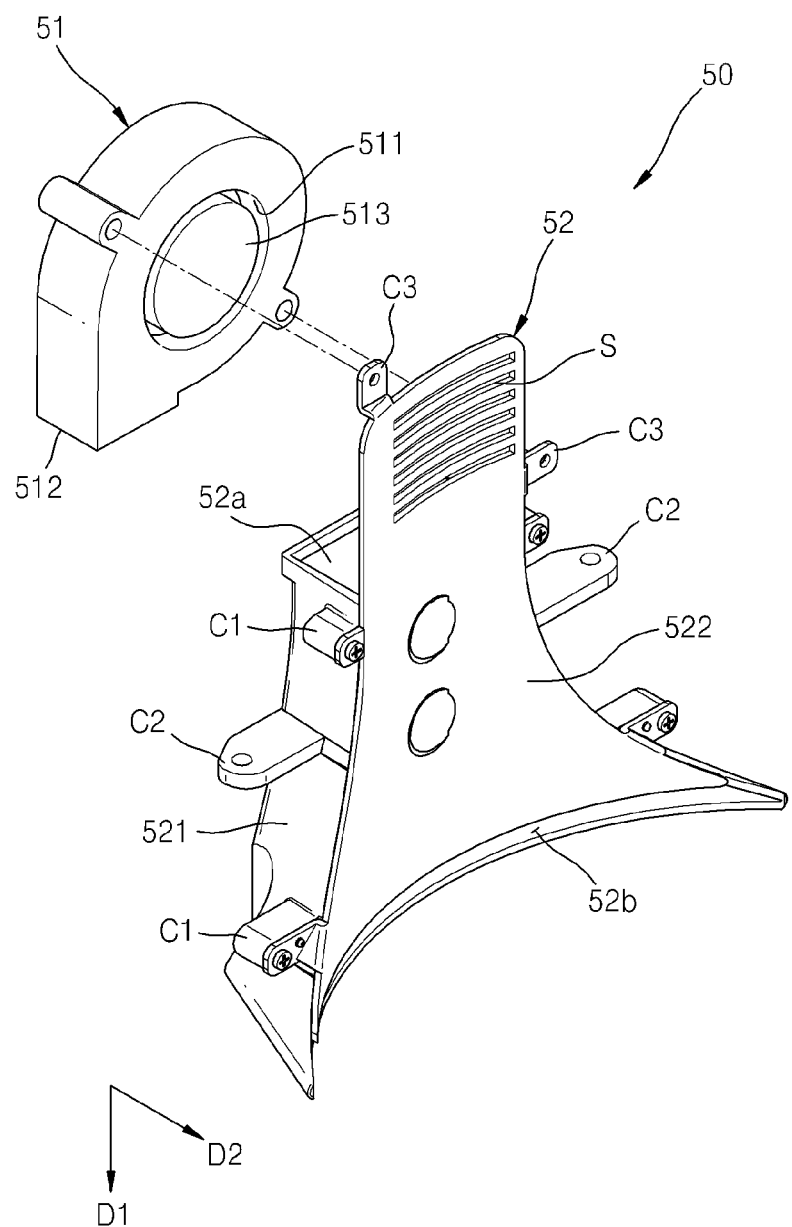
FIG. 3 is a perspective view of a condensation preventing unit shown in FIGS. 1 and 2, according to an exemplary embodiment.
Figure 4:
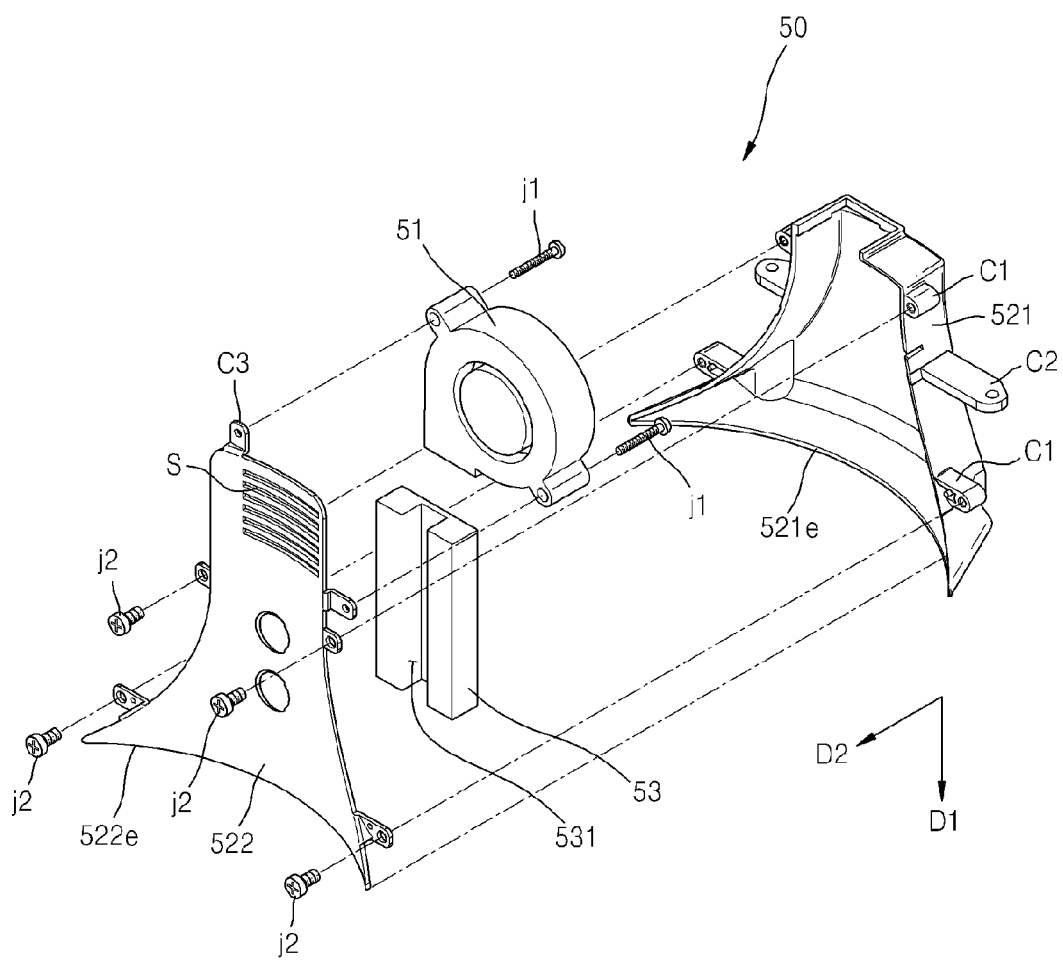
FIG. 4 is an exploded perspective view of the condensation preventing unit of FIG. 3, according to an exemplary embodiment.

FIG. 3 is a schematic perspective view of the condensation preventing unit 50, according to an exemplary embodiment, and FIG. 4 is an exploded perspective view of the condensation preventing unit 50 of FIG. 3, according to an exemplary embodiment.

Referring to FIGS. 3 and 4, the condensation preventing unit 50 includes an air blower 51 for generating a flow of air, a heater 53 for heating the air, and a duct 52. The heater 53 may be an optional element of the condensation preventing unit 50.

The air blower 51 includes an impeller 513 received therein to generate the air flow. The air blower 51 includes an air inlet 511 for drawing in the air, and an outlet 512 for discharging the air flowed by the impeller 513. For example, the air blower 51 may be a centrifugal blower, in which the air inlet 511 is in parallel with a rotary shaft of the impeller 513, and the outlet 512 is perpendicular to the air inlet 511. The air discharged through the outlet 512 proceeds toward an inlet 52a of the duct 52.

The duct 52 includes the inlet 52a for drawing in the air and an exhaust hole 52b for discharging the air. A size of the inlet 52a of the duct 52 may be substantially the same as a size of the outlet 512 of the air blower 51. The duct 52 has a width that is gradually widened from the inlet 52a toward the exhaust hole 52b, and the exhaust hole 52b is formed at the widest portion of the duct 52. The duct 52 may include a first duct portion 521 and a second duct portion 522 that is coupled to the first duct portion 521.

The first duct portion 521 is opened toward the D2 direction (front portion) and is opened toward a direction opposite to a D1 direction (upper portion), and has a width that is gradually increased in the D1 direction. The opening toward the direction opposite to the D1 direction is the inlet 52a.

The first duct portion 521 has an empty inner space, in which the heater 53 may be received. The first duct portion 521 may have first coupling portions C1 to be coupled to the second duct portion 522. For example, the first duct portion 521 and the second duct portion 522 may be coupled to each other via screws j2. The first duct portion 521 may have second coupling portions C2 to be coupled to the inner shell 120. The condensation preventing unit 50 is fixed to the inner shell 120 via the second coupling portions C2.

The second duct portion 522 has a width that is gradually increased toward the D1 direction, and is disposed in front of the first duct portion 521 to be coupled to the first duct portion 521. Here, an end portion 522e of the second duct portion 522 is shorter than an end portion 521e of the first duct portion 521, and the second duct portion 522 and the first duct portion 521 are coupled to each other while a predetermined space is interposed between the end portion 522e of the second duct portion 522 and the end portion 521e of the first duct portion 521. The space between the end portion 522e of the second duct portion 522 and the end portion 521e of the first duct portion 521 is opened toward the D2 direction and forms the exhaust hole 52b.

An upper portion of the second duct portion 522 may extend past the first duct portion 521 in the direction opposite to the D1 direction. A third coupling portion C3, to which the air blower 51 may be coupled, may be formed on the extended upper portion of the second duct portion 522. For example, the air blower 51 and the second duct portion 522 may be coupled to each other via a screw j1. In the current exemplary embodiment, the air is drawn in by the air blower 51 after passing through the upper portion of the second duct portion 522, and thus, the extending surface may include slits S through which the air may pass.

The heater 53 is received in the duct 52 so as to heat the air induced in the duct 52. The heater 53 may operate at a reference temperature or lower. For example, the heater 53 may operate when an inner temperature in the surveillance camera apparatus 1 is −10° C. or less.

The heater 53 may include a flow path 531 through which the air flows. For example, one heater 53 may include the flow path 531 in itself, or two heater units (not shown) may be disposed apart from each other by a predetermined distance to form the flow path 531. When the air passes through the flow path 531, the heat generated by the heater 53 may be effectively supplied to the air.

The duct 52 receiving the heater 53 therein may be formed of a plastic material or a metal material. As an example, the duct 52 formed of a metal may transfer some of the heat generated by the heater 53 out of the duct 52, and the heat transferred may maintain the inner temperature of the surveillance camera apparatus 1 at a predetermined level. When the surveillance camera apparatus 1 is installed outdoors, during winter, components such as the circuit module of the surveillance camera apparatus 1 may break or may not operate due to an extremely low temperature environment. The inner temperature of the surveillance camera apparatus 1 of the present exemplary embodiment may be maintained at a predetermined level due to heat from the heated air after the air has proceeded along the inner circumferential surface of the dome cover 30, and thus, abnormal operations of the components such as the circuit module may be prevented. The above effect in which the heat generated by the heater 53 may be transferred throughout the surveillance camera apparatus 1 may be enhanced when the duct 52 is formed of a metal. On the other hand, if the heater 53 may not be used in a high temperature environment such as during summer, in which case the air blower 51 may generate air to lower down the high temperature of the surveillance camera apparatus 1 and remove moisture formed on the dome cover 30.

The condensation preventing unit 50 having the above structure draws in the air from the direction opposite to the D2 direction to heat the air, and after that, discharges the heated air in the D2 direction. The inner case 40 changes the proceeding direction of the heated air discharged in the D2 direction to the D1 direction such that the air proceeds while in contact with the inner surface of the dome cover 30. The air flow in the surveillance camera apparatus 1 will be described in more detail as follows.

Figure 5:
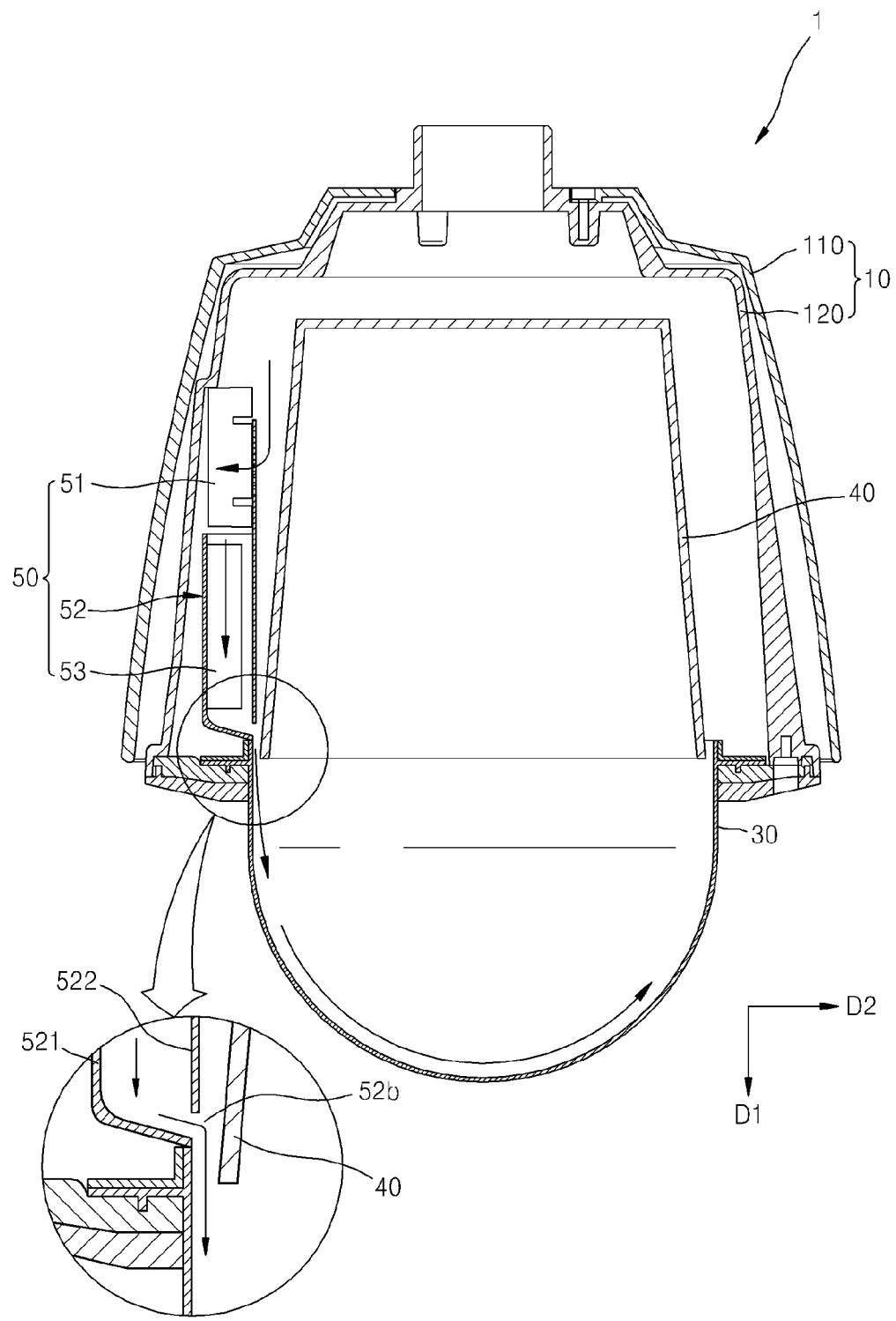
FIG. 5 is a cross-sectional view of the monitoring apparatus of FIG. 1, according to an exemplary embodiment.
Figure 6:
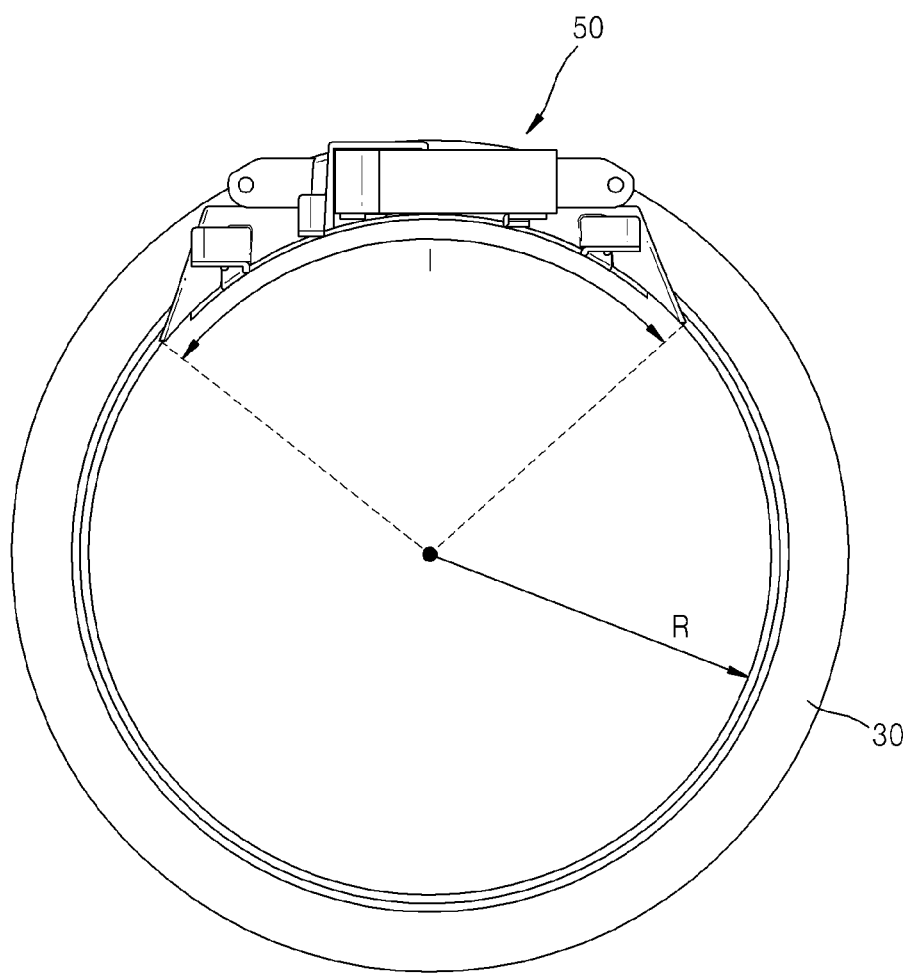
FIG. 6 is a plan view of a dome cover and the condensation preventing unit shown in FIG. 1 seen from an upper side, according to an exemplary embodiment.

FIG. 5 is a cross-sectional view of the surveillance camera apparatus 1, according to an exemplary embodiment, and FIG. 6 is an upper plan view of the surveillance camera apparatus 1, showing the condensation preventing unit 50 and the dome cover 30, according to an exemplary embodiment.

Referring to FIG. 5, the condensation preventing unit 50 is disposed between the inner case 40 and the housing 10 along the circumference of the dome cover 30. A predetermined space may be formed between the condensation preventing unit 50 and the inner case 40, and the air blower 51 draws in air inside the housing 10 via the above space. The drawn in air is moved into the duct 52 in the D1 direction.

The air moved inside the duct 52 is heated by the heater 53, and then is discharged out of the duct 52 through the exhaust hole 52b. In the present embodiment, since the exhaust hole 52b is opened toward the D2 direction, the heated air is discharged in the D2 direction.

Referring to an expanded part of FIG. 5, the inner case 40 is disposed to face the exhaust hole 52b and at a predetermined distance away from the exhaust hole 52b. The inner case 40 has an outer diameter that is less than an inner diameter of the dome cover. Therefore, the inner case 40 changes the proceeding direction of the heated air discharged in the D2 direction to the D1 direction. Here, an end portion of the inner case 40 may extend past the exhaust hole 52b in the D1 direction. The end portion of the inner case 40 may face a part of the dome cover. For example, the end portion of the inner case 40 may face a part of the inner surface of the dome cover. Through this configuration, a path, through which the heated air may pass, may be locally formed between the end portion of the inner case 40 and the dome cover 30, and thus, the heated air may proceed in the D1 direction without leaking in other directions.

Since the width of the duct 52 increases toward the exhaust hole 52b and the exhaust hole 52b is formed at the widest portion, the heated air discharged through the exhaust hole 52b may heat all portions of the dome cover 30. For example, the heated air heats half of the dome cover 30, and then, heats the other half of the dome cover 30 while proceeding along the other half.

Here, in order to prevent a dead area, on which the heated air does not pass, from occurring on the inner surface of the dome cover 30, the duct 52 may be formed as an arc that is curved along the circumference of the hemispherical dome cover 30. Since the duct 52 is formed as an arc, the exhaust hole 52b is also formed as an arc. Referring to FIG. 6, an arc length I of the duct 52, that is, an arc length of the exhaust hole 52b, may be equivalent to or larger than 0.25 times a circumference ($2\pi R$) of the dome cover 30. For example, the arc length I of the exhaust hole 52b may be 0.25 to 0.5 times the circumference of the dome cover 30.

If the arc length I of the exhaust hole 52b is less than 0.25 times the circumference of the dome cover 30, a dead area occurs, and thus, it is difficult to prevent condensations or frost from accumulating on the dome cover 30. On the other hand, if the arc length I of the exhaust hole 52b is greater than 0.5 times the circumference of the dome cover 30, a size of the condensation preventing unit 50 becomes larger, and thus, the condensation preventing unit 50 may occupy a lot of space in the housing 10.

Figure 7:
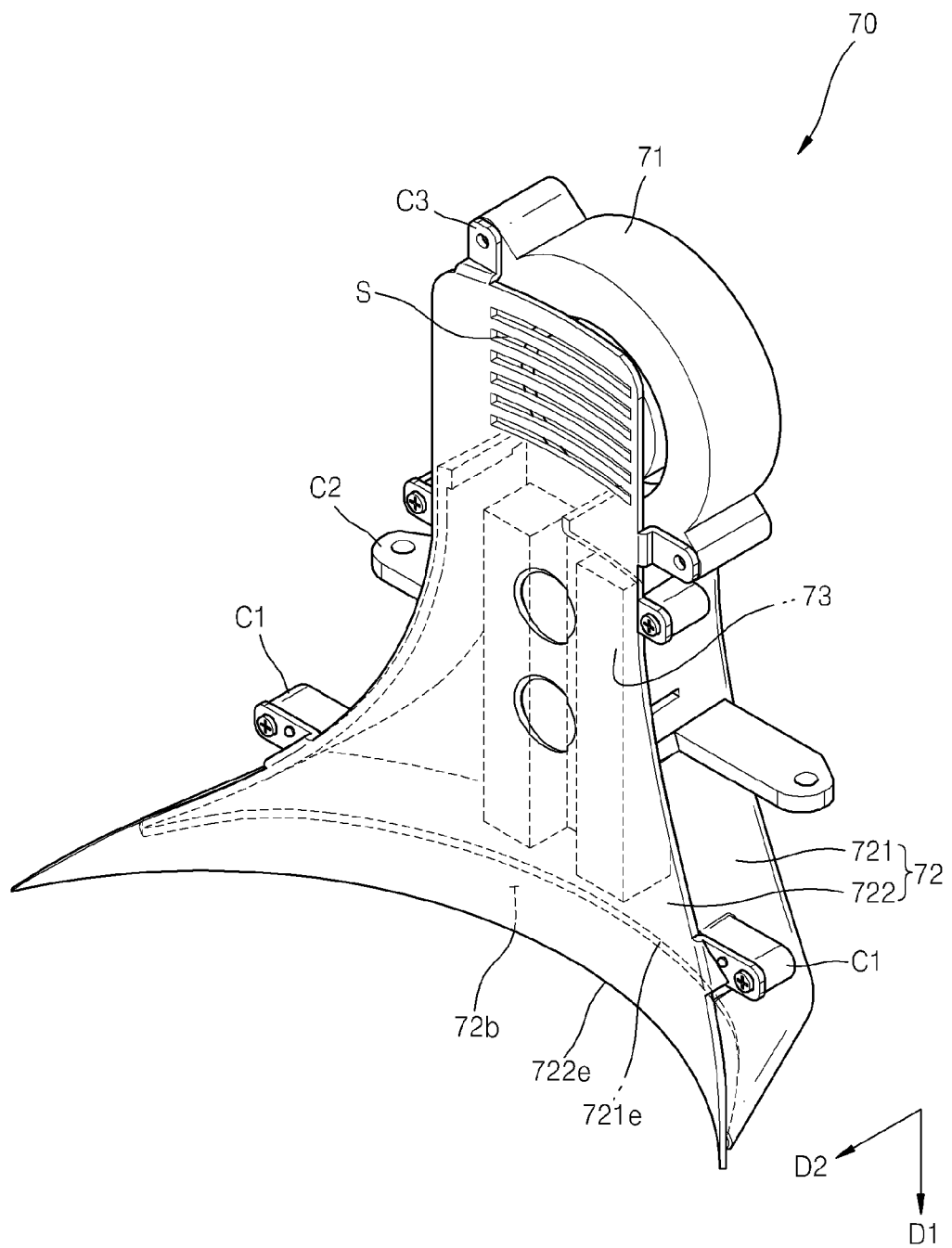
FIG. 7 is a schematic perspective view of a condensation preventing unit according to another exemplary embodiment.

FIG. 7 is a schematic perspective view of a condensation preventing unit 70, according to another exemplary embodiment.

Referring to FIG. 7, the condensation preventing unit 70 of the present exemplary embodiment includes an air blower 71 for generating a flow of air, a heater 73 for heating the air (optional), and a duct 72. Air discharged from the air blower 71 proceeds toward an inlet of the duct 72, and then, is heated by the heater 73 and discharged out of the duct 72 through an exhaust hole 72b of the duct 72. In addition, like the condensation preventing unit 50 shown in FIGS. 3 and 4, the duct 72 has a width that is increased toward the exhaust hole 72b, the exhaust hole 72b is formed at the widest side of the duct 72, and the duct 72 is formed as an arc curved along the circumference of the dome cover 30.

However, the condensation preventing unit 70 of the present exemplary embodiment is different from the condensation preventing unit 50 of the previous exemplary embodiment in that the exhaust hole 72b is opened toward the D1 direction (lower portion). Structures and features of the air blower 71, the heater 73, and the duct 72 that are the same as those of the previous exemplary embodiment are not described here, and differences will be described as follows.

The duct 72 includes an inlet through which the air discharged from the air blower 71 is induced and the exhaust hole 72b for discharging the air heated by the heater 73. The inlet is opened toward the direction opposite to the D1 direction (upper portion), and the exhaust hole 72b is opened toward the D1 direction (lower portion).

A first duct portion 721 is opened toward the D2 direction (front portion) and is opened toward the direction opposite to the D1 direction (upper portion), and is also opened partially toward the D1 direction (lower portion). The opening toward the D1 direction is the exhaust hole 72b.

A second duct portion 722 is disposed in front of the first duct portion 721, and is coupled to the first duct portion 721. Here, the second duct portion 722 is coupled to the first duct portion 721 while the first duct portion 721 is apart from an end portion 721e of the first duct portion 721 by a predetermined distance to form the exhaust hole 72b. In addition, an end portion 722e of the second duct portion 722 may extend past the first duct portion 721 in the D1 direction so that the heated air may proceed along the inner surface of the dome cover 30 without leaking in other directions.

Figure 8:
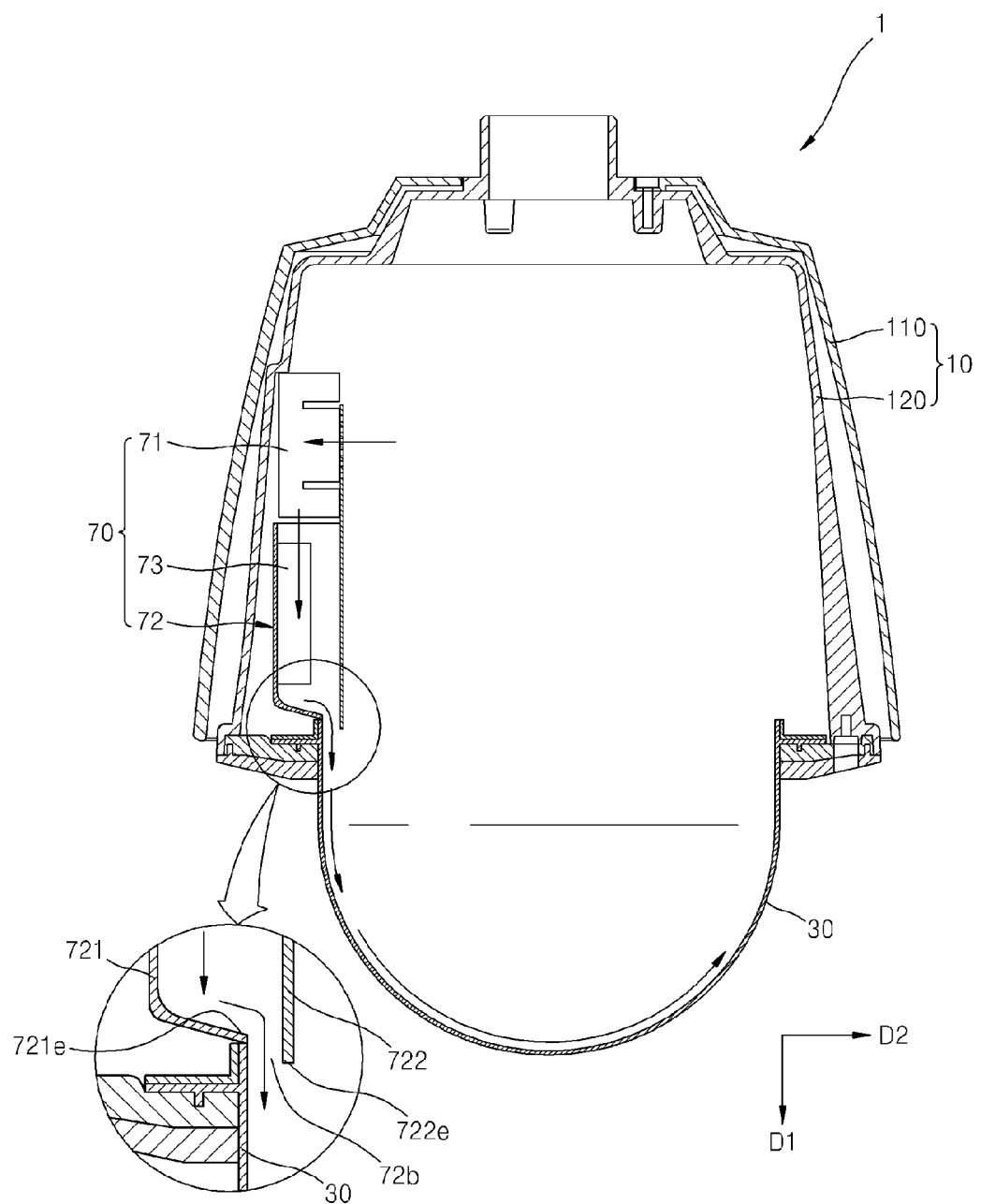
FIG. 8 is a schematic cross-sectional view showing an inner portion of the surveillance camera apparatus including the condensation preventing unit of FIG. 7, according to an exemplary embodiment.

FIG. 8 is a cross-sectional view of the surveillance camera apparatus 1 including the condensation preventing unit 70 of FIG. 7, according to an exemplary embodiment, and more particularly, FIG. 8 shows input/output of air in the condensation preventing unit 70.

Referring to FIG. 8, the air blower 71 draws in the air in the housing 10. The drawn in air is heated by the heater 73, and then, is discharged through the exhaust hole 72b. Here, as described above, the heated air is discharged in the D1 direction.

Referring to an expanded part of FIG. 8, since the end portion 722e of the second duct portion 722 extends to a predetermined length in the D1 direction, a path through which the heated air may flow is locally formed between the end portion 722e of the second duct portion 722 and the dome cover 30. The heated air may flow in the D1 direction through this path without leaking in other directions.

In the present exemplary embodiment, since the width of the duct 72 is increased toward the exhaust hole 72b, and the exhaust hole 72b is formed at the widest portion of the duct 72, the heated air discharged through the exhaust hole 72b may heat all portions of the dome cover 30. For example, the heated air may heat half of the dome cover 30, and then, may heat the other half of the dome cover while flowing along the other half.

Here, in order to prevent a dead area, on which the heated air does not pass, from occurring on the inner circumferential surface of the dome cover 30, the duct 72 may be formed as an arc that is curved along the circumference of the hemispherical dome cover 30. Since the duct 72 is formed as an arc, the exhaust hole 72b is also formed as an arc. As described in the previous exemplary embodiment, an arc length of the exhaust hole 72b may be equivalent to or larger than 0.25 times the circumference ($2\pi R$) of the dome cover 30.

Figure 9:
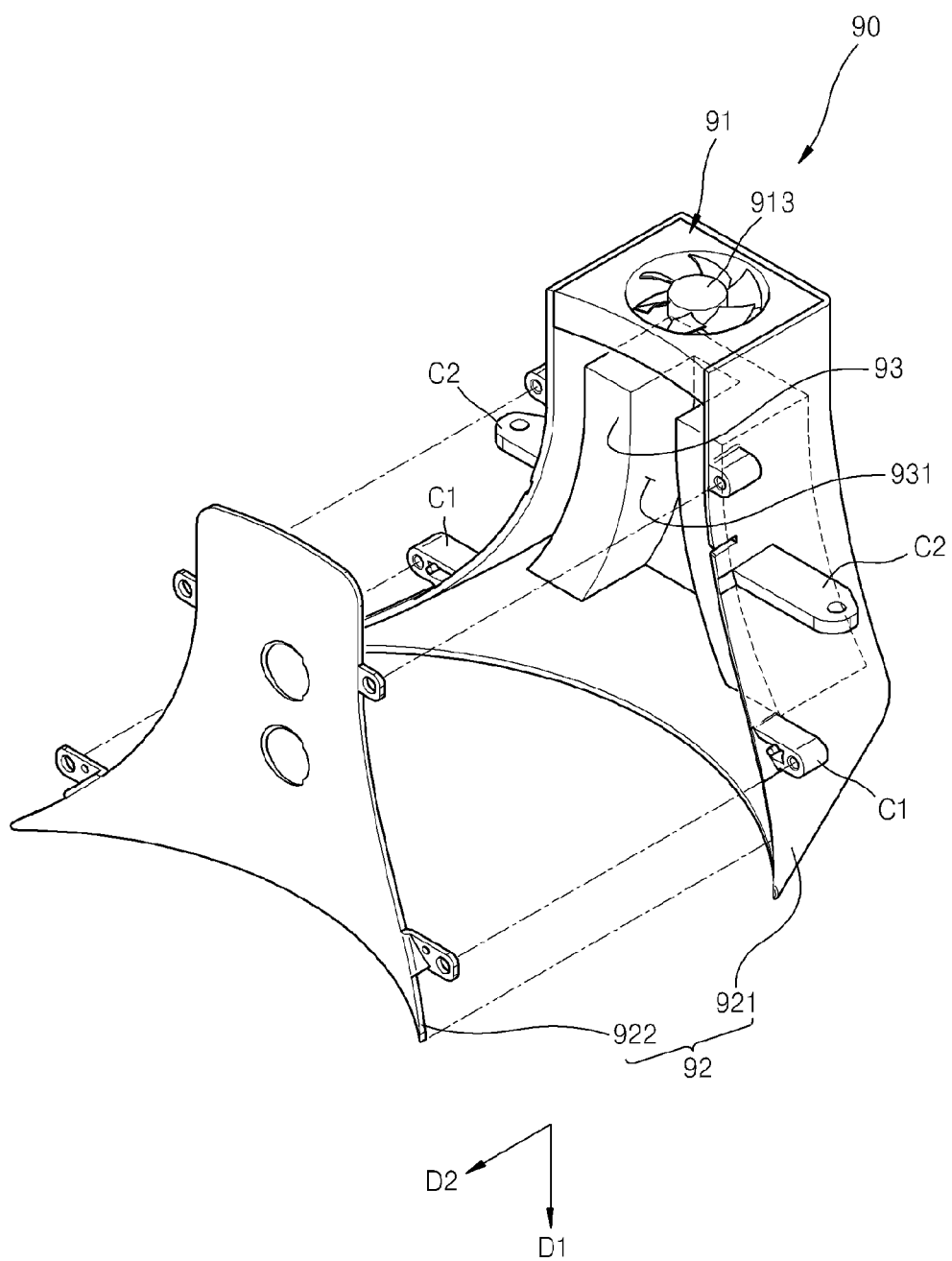
FIG. 9 is schematic perspective views of a condensation preventing unit according to still another exemplary embodiment.

FIG. 9 is a schematic perspective view of a condensation preventing unit 90 according to still another exemplary embodiment.

Referring to FIG. 9, the condensation preventing unit 90 of the present exemplary embodiment includes an air blower 91 for generating a flow of air, a heater 93 (optional) for heating the air, and a duct 92. Air discharged from the air blower 91 flows toward an inlet of the duct 92 and is heated by the heater 93, and then, is discharged out of the duct 92 through an exhaust hole of the duct 92. In addition, as described in the previous exemplary embodiment shown in FIGS. 3 and 4, a width of the duct 92 is increased toward the exhaust hole, the exhaust hole is formed at the widest portion of the duct 92, and the duct 92 is curved along the circumference of the dome cover 30.

However, the condensation preventing unit 90 is different from those of the previous exemplary embodiments in view of the air blower 91 and the heater 93. Differences of the duct 92 including a first duct portion 921 and a second duct portion 922 from those of the previous exemplary embodiments will be described as follows.

The air blower 91 is a fan type, that is, may be an axial blower that draws in and discharges the air in an axial direction of an impeller 913. The air blower 91 is fixed in the duct 92 to draw in the air inside the housing 10 and discharge the air into the duct 92. Therefore, there is no need to extend the second duct portion 922 upward in order to fix the air blower 91.

The heater 93 is installed in the duct 92 to heat the air discharged from the air blower 91. Here, a width of the heater 93 may increase toward the exhaust hole, and a width of a flow path 931, through which the air flows, may also gradually increase toward the exhaust hole.

Figure 10:
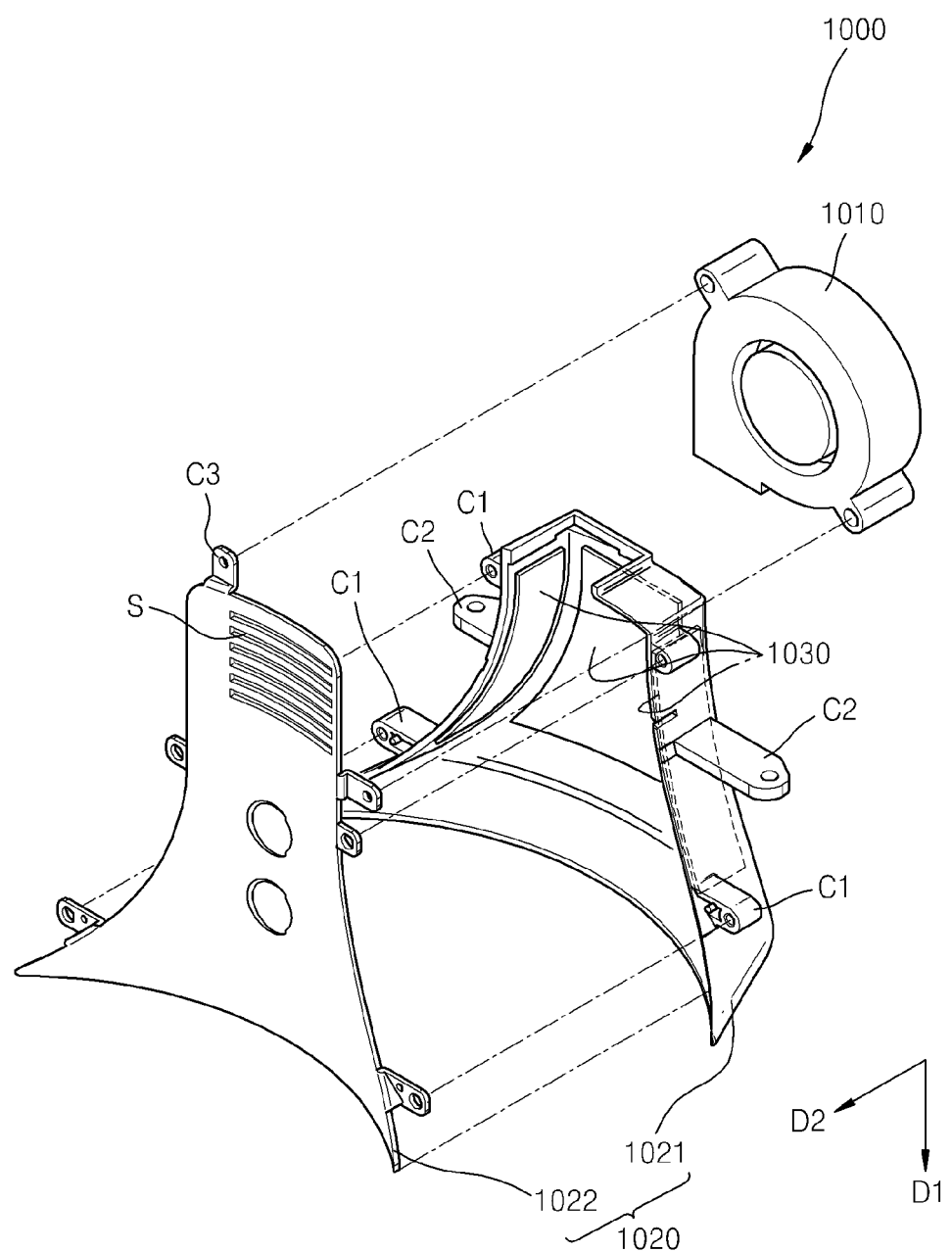
FIG. 10 is schematic perspective views of a condensation preventing unit according to still another exemplary embodiment.

FIG. 10 is a schematic perspective view of a condensation preventing unit 1000 according to still another exemplary embodiment.

Referring to FIG. 10, the condensation preventing unit 1000 of the present exemplary embodiment includes an air blower 1010 for generating a flow of air, a heater 1030 (optional) for heating the air, and a duct 1020. Air discharged from the air blower 1010 flows toward an inlet of the duct 1020 and is heated by the heater 1030, and then, is discharged out of the duct 1020 through an exhaust hole of the duct 1020. In addition, as described in the previous exemplary embodiment shown in FIGS. 3 and 4, a width of the duct 1020 is increased toward the exhaust hole, the exhaust hole is disposed at the widest portion of the duct 1020, and the duct 1020 is curved along the circumference of the dome cover 30.

On the other hand, the condensation preventing unit 1000 is different from those of the previous embodiments in view of a shape of the heater 1030. Differences of the air blower 1010 and the duct 1020 including a first duct portion 1021 and a second duct portion 1022 from those of the previous embodiment will be described as follows.

The heater 1030 is a film-type heater that may be received in the duct 1020. A plurality of heaters 1030 may be fixed on an inner surface of the duct 1020. The heater 1030 of the present exemplary embodiment may selectively operate at a reference temperature, for example, −10° C., or less.

In the above descriptions, the heater 53, 73, 93, or 1030 is installed in the duct 52, 72, 92, or 1020; however, the inventive concept is not limited thereto. For example, an air blower may draw in air already heated by a heater.

Figure 11:
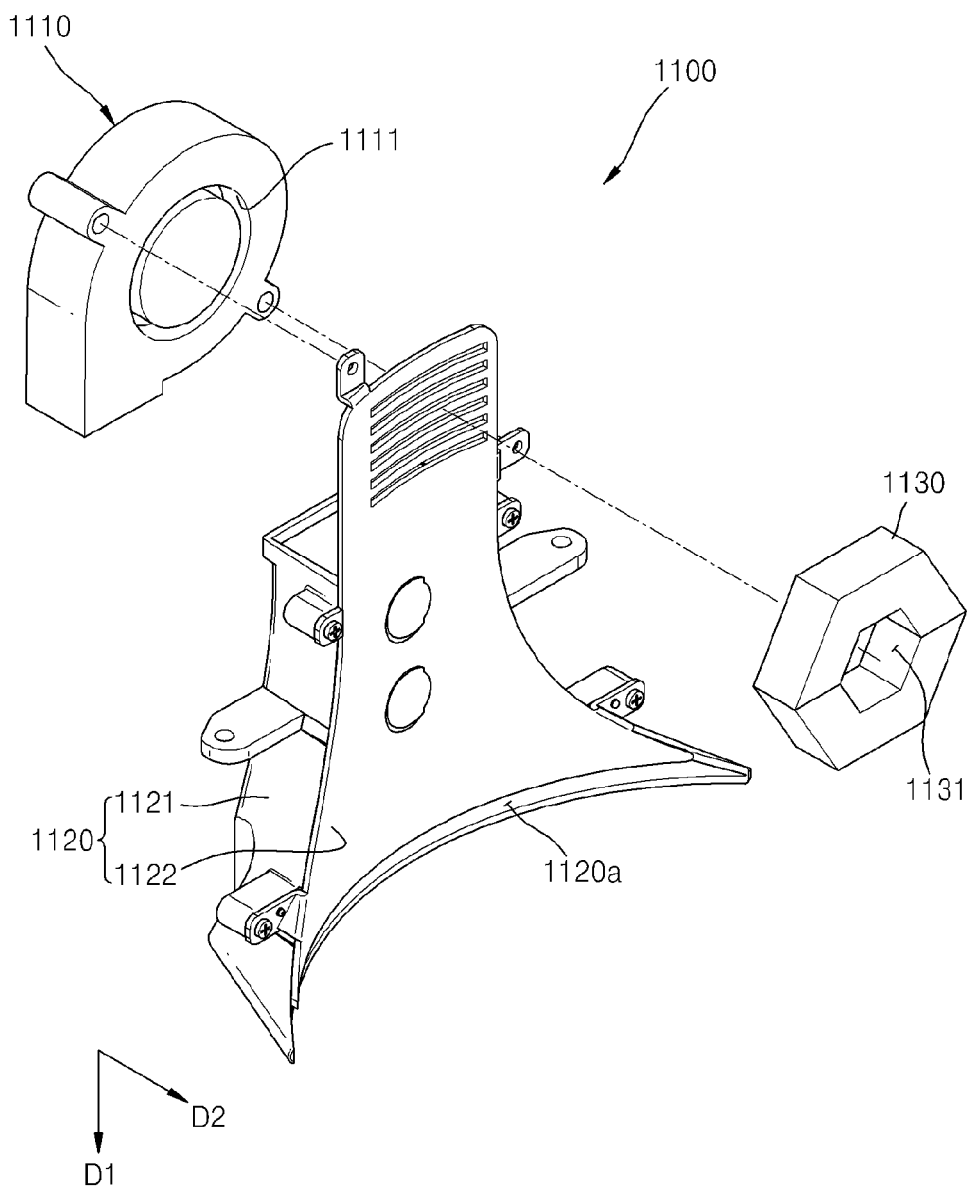
FIG. 11 is a schematic perspective view of a condensation preventing unit according to still another exemplary embodiment.

Referring to FIG. 11 illustrating a condensation preventing unit 1100 according to still another exemplary embodiment, a heater 1130 (optional) may be disposed adjacent to an inlet 1111 of an air blower 1110 so that the air blower 1110 may draw in heated air. For example, the heater 1130 and the air blower 1110 may be disposed to face each other with a second duct portion 1122 interposed therebetween. The heater 1130 may include a flow path 1131 so that the air flowing to the inlet 1111 may be heated by the heater 1130.

The air heated by the heater 1130 is induced into the duct 1120 by the air blower 1110, and is discharged through an exhaust hole 1120a to transfer heat to the dome cover 30. The heated air discharged through the exhaust hole 1120a may flow as described with reference to FIG. 5.

According to the above exemplary embodiments, generation of condensations, frost and/or moisture on a dome cover may be prevented by making heated air flow along with all portions of the dome cover.

In addition, according to the exemplary embodiments, an inner temperature of a surveillance camera may be maintained at a predetermined level or higher so that components such as a circuit module that is electrically connected to a photographing portion may operate normally.

In addition, according to the exemplary embodiments, since air is discharged through a duct, and a width of which is increased toward an exhaust hole, there is no need to install a plurality of ducts in even a large-sized surveillance camera apparatus. Thus, fabrication costs may be reduced.

While exemplary embodiments have been particularly shown and described with reference to accompanying drawings thereof, it will be understood by those of ordinary skill in the art that various changes in form and details may be made therein without departing from the spirit and scope of the inventive concept as defined by the appended claims.

What is claimed is:

1. A housing assembly comprising:
   a cover which receives a photographing component therein;
   an air blower which provides air to the cover; and
   a duct through which the air provided from the air blower is discharged to the cover,
   wherein the duct has a width that is gradually increased from an end to another end, and comprises an exhaust hole, through which the air is discharged to the cover, at around the other end and adjacent to the cover,
   wherein the duct comprises a single duct.

2. The housing assembly of claim 1, further comprising a heater which heats the air provided from the air blower.

3. The housing assembly of claim 1, further comprising a heater that is adjacent to the air blower,
   wherein the air blower draws in the air heated by the heater and provides the heated air to the duct.

4. The housing assembly of claim 1, wherein the cover is a dome cover.

5. The housing assembly of claim 4,
   wherein the dome cover is a hemisphere and the exhaust hole is formed as an arc curved along a circumference of the dome cover.

6. The housing assembly of claim 5, wherein, an arc length of the exhaust hole is equivalent to or larger than 0.25 times the circumference of the dome cover.

7. The housing assembly of claim 4,
   wherein the dome cover is a hemisphere and the exhaust hole is formed as an arc curved along a circumference of the dome cover, and an arc length of the exhaust hole is 0.25 times to 0.5 times the circumference of the dome cover.

8. The housing assembly of claim 1, wherein the exhaust hole is formed toward the cover so that the air discharged through the exhaust hole flows along an inner surface of the cover disposed on a lower portion of the housing assembly.

9. The housing assembly of claim 1, wherein the duct comprising an inlet hole at the end and an exhaust hole at the another end, and
   wherein the air blower is connected to the inlet hole and the air is discharged to the cover through the exhaust hole provided adjacent to the cover.

10. A housing assembly comprising:
   an air blower which generates and provides a flow of air to a dome cover which is configured to receive a photographing component therein;
   a heater heating the air provided from the air blower; and
   a duct comprising an exhaust hole through which the air flow provided from the air blower is discharged to the dome cover,
   wherein the exhaust hole of the duct is disposed adjacent to the dome cover, wherein the duct has a width that is gradually increased from an end portion to another portion, and
wherein the exhaust hole is disposed at the another portion,
   wherein the housing assembly includes only a single duct.

11. The housing assembly of claim 10, the heater is received in the duct.

12. The housing assembly of claim 10, wherein the duct comprises a metal.

13. The housing assembly of claim 10, wherein the exhaust hole is curved along a circumference of the dome cover.

14. The housing assembly of claim 13, wherein the dome cover is hemispherical and the exhaust hole is formed as an arc curved along the circumference of the dome cover, and an arc length of the exhaust hole is equivalent to or larger than 0.25 times the circumference of the dome cover.

15. The housing assembly of claim 13, wherein the dome cover is hemispherical and the exhaust hole is formed as an arc curved along the circumference of the dome cover, and an arc length of the exhaust hole is 0.25 times to 0.5 times the circumference of the dome cover.

16. The housing assembly of claim 10, further comprising an inner case which guides the air discharged through the exhaust hole to flow along an inner surface of the dome cover disposed under the housing assembly, and has an outer diameter that is less than an inner diameter of the dome cover.

17. The housing assembly of claim 16, wherein an end portion of the inner case extends past the duct toward the cover.

18. The housing assembly of claim 17, wherein the end portion faces an part of the dome cover.

19. The housing assembly of claim 10, wherein the duct further comprises an inlet hole on which the air blower connects to the duct.

* * * * *